(12) United States Patent
Kim et al.

(10) Patent No.: US 8,645,029 B2
(45) Date of Patent: Feb. 4, 2014

(54) VEHICLE CONTROL SYSTEM FOR DRIVER-BASED ADJUSTMENTS

(75) Inventors: Young Suk Kim, Seoul (KR); Jong Kyun Shin, Gyeonggi-Do (KR); Kyeong Won Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 76 days.

(21) Appl. No.: 13/312,959

(22) Filed: Dec. 6, 2011

(65) Prior Publication Data

US 2013/0013157 A1    Jan. 10, 2013

(30) Foreign Application Priority Data

Jul. 4, 2011   (KR) .......................... 10-2011-0066118

(51) Int. Cl.
*B60R 22/00*   (2006.01)

(52) U.S. Cl.
USPC ........................................... 701/49; 382/118

(58) Field of Classification Search
USPC ................ 701/49, 36; 382/118, 116
See application file for complete search history.

(56) References Cited

U.S. PATENT DOCUMENTS

| | | | |
|---|---|---|---|
| 4,975,969 A * | 12/1990 | Tal ................................. | 382/116 |
| 6,400,835 B1 * | 6/2002 | Lemelson et al. ............ | 382/118 |
| 8,238,617 B2 * | 8/2012 | Omoto et al. ................. | 382/118 |
| 2002/0097145 A1 * | 7/2002 | Tumey et al. ................. | 340/426 |
| 2006/0193502 A1 * | 8/2006 | Yamaguchi .................... | 382/118 |
| 2006/0273880 A1 * | 12/2006 | Yuhara ......................... | 340/5.83 |
| 2007/0063816 A1 * | 3/2007 | Murakami et al. ............ | 340/5.82 |
| 2007/0159309 A1 * | 7/2007 | Ito et al. ...................... | 340/425.5 |
| 2007/0229499 A1 * | 10/2007 | Aoyama et al. ............... | 345/420 |
| 2009/0102222 A1 * | 4/2009 | Kato et al. .................... | 296/65.08 |
| 2010/0014721 A1 * | 1/2010 | Steinberg et al. ............. | 382/118 |
| 2010/0177412 A1 * | 7/2010 | Lee et al. ...................... | 359/843 |
| 2011/0285186 A1 * | 11/2011 | Demmelmeier et al. .. | 297/217.1 |

FOREIGN PATENT DOCUMENTS

| | | |
|---|---|---|
| JP | 2006-219009 A | 8/2006 |
| JP | 2007-253808 A | 10/2007 |
| KR | 10-0571038 A | 8/2005 |

* cited by examiner

*Primary Examiner* — Thomas Black
*Assistant Examiner* — Shardul Patel
(74) *Attorney, Agent, or Firm* — Edwards Wildman Palmer LLP; Peter F. Corless (57) ABSTRACT

A control system of a vehicle according to an exemplary embodiment of the present invention may include an input portion for inputting an order for generating an virtual avatar of a driver, an image detection portion that detects an outside image of the driver according to the order that is input by the input portion, an avatar generating portion that transforms the image of the real driver into the virtual avatar, and an integrated control portion that controls a driver seat, a steering device, a side view mirror, or a rear view mirror according to the shape of the virtual avatar.

13 Claims, 11 Drawing Sheets

VEHICLE CONTROL SYSTEM FOR DRIVER-BASED ADJUSTMENTS

CROSS-REFERENCE TO RELATED APPLICATION

This application claims priority to and the benefit of Korean Patent Application No. 10-2011-0066118 filed in the Korean Intellectual Property Office on Jul. 4, 2011, the entire contents of which are incorporated herein by reference.

BACKGROUND OF THE INVENTION (a) Field of the Invention

The present invention relates to a control system of a vehicle that adjusts a seat, a steering wheel, a side view mirror, and a rear view mirror according to a body type, e.g., to reduce tiredness of a driver and improve comforts of driving.

(b) Description of the Related Art

Generally, improvements have been made to vehicles to reduce the tiredness of a vehicle driver, as well as to minimize actions by the driver other than driving the vehicle, thus meeting the demands of vehicle users. For example, when a driver sits on a driver's seat, a position of the left and/or right side view mirrors may be adjusted according to that driver's body type.

Meanwhile, when another driver takes over, the seat, the steering device, and the mirrors are not adjusted according to the other driver's body type, and therefore there is a problem that further setting needs to be performed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a control system of a vehicle having advantages of improving driving comfort by automatically setting a seat, a steering device, and a mirror according to a current driver's body shape, particularly when a driver is exchanged with another.

A control system of a vehicle according to an exemplary embodiment of the present invention may include an input portion for inputting an order for generating a virtual avatar of a driver, an image detection portion that detects an outside image of the driver according to the order that is input by the input portion, an avatar generating portion that transforms the image of the real driver to the virtual avatar, and an integrated control portion that controls a driver seat, a steering device, a side view mirror, or a rear view mirror according to the shape of the virtual avatar.

The integrated control portion may apply the virtual avatar that is made by the avatar generating portion in a virtual vehicle.

The integrated control portion may return the driver seat, the steering device, the side view mirror, or the rear view mirror to an original position and applies the virtual avatar to the original position.

The integrated control portion may include a seat control portion that controls front/rear position, height, and slope of a seat back of the driver seat.

The seat control portion may control a front/rear position of the driver seat such that the knee angle of the virtual avatar becomes a predetermined angle in a condition that the virtual avatar pushes the brake to its limit, may control the slope of the seat back such that the seat back is slanted to a predetermined angle, may control the height of the seat of the driver such that the gazing distance that the virtual avatar sees through a front window of the vehicle becomes a predetermined length, may control the position of the lumbar supporting portion of the driver seat along the lumbar slope of the virtual avatar, and may control the neck supporting portion of the driver seat to coincide with an occipital region center.

The integrated control portion may control a telescopic length and a tilting angle of the steering device.

The steering device control portion may make both hands of the virtual avatar grasp predetermined positions of the steering wheel, control a tilting angle of the steering wheel such that the shoulder height of the virtual avatar becomes equal to the height of the hands grasping the steering wheel, and control a telescopic length of the steering wheel such that the elbow angle of the virtual avatar becomes a predetermined value.

The integrated control portion may include a mirror control portion that controls up/down/left/right angles of the side view mirror or the rear view mirror.

The mirror control portion may controls the up/down angle of the side view mirror such that the ratio of the lower portion of a virtual horizontal line, which is seen by the eye of the virtual avatar through the side view mirror, becomes a predetermined value, and may control the left/right angle of the side view mirror such that the ratio of the outside of the vehicle body, which is seen by the virtual avatar through the side view mirror, becomes a predetermined value.

The mirror control portion may control the left/right angle of the rear view mirror such that the eye of the virtual avatar gazes at a central portion of the rear window through the rear view mirror, and controls the up/down angle of the rear view mirror such that the gazing distance of the virtual avatar through the rear view mirror becomes a predetermined value.

The input portion may be an input unit that is disposed in the vehicle or a portable communication means. The image detecting portion may be a rear camera of a vehicle.

A control method of a vehicle, according to an exemplary embodiment of the present invention, may include inputting an order for generating a virtual avatar of a driver, detecting an outside image of the driver according to the input order, transforming the detected image of the driver into an virtual avatar, and controlling a driver seat, a steering device, a side view mirror, or a rear view mirror according to the shape of the virtual avatar.

As described above, an order for generating a virtual avatar is input through an input portion such as a smart phone and a telematic server controller, a new driver's image is detected by an image detector such as a rear camera, a 3D virtual avatar is generated with the driver's image detected by the detector, and the virtual avatar is applied to a coordinator corresponding to a vehicle such that a seat, a steering device, a side view mirror, and a rear view mirror can be automatically set in the control system of the vehicle according to the present invention.

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
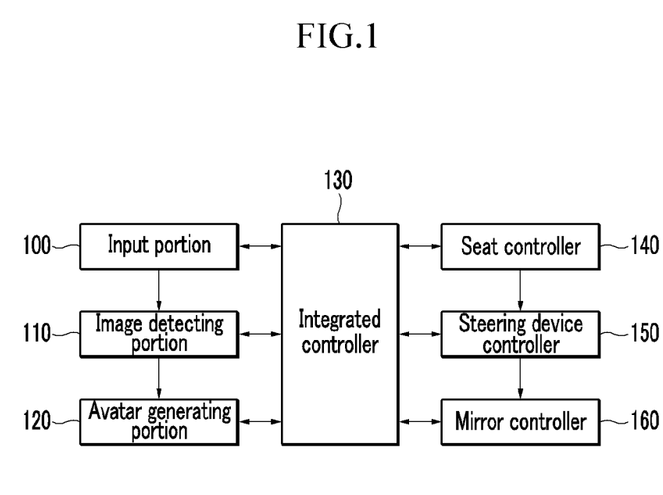
FIG. 1 is a schematic diagram of a vehicle according to an exemplary embodiment of the present invention.

FIG. 1 is a schematic diagram of a vehicle according to an exemplary embodiment of the present invention.

Referring to FIG. 1, a vehicle includes an input portion 100, an image detecting portion 110, an avatar generating portion 120, an integrated control portion 130, a seat control portion 140, a steering device control portion 150, and a mirror control portion 160.

A driver inputs an order for generating a virtual avatar through the input portion 100, and the image detecting portion 110 detects a driver's image according to the input order through the input portion 100.

Further, the avatar generating portion 120 uses the driver's image detected by the image detecting portion 110 to generate a 3D virtual avatar.

The input portion 100 is an input means for inputting an order, and can be a personal mobile communication means such as a smart phone and a telematic server controller, e.g., that is controlled by a driver.

The integrated control portion 130 applies a 3D virtual avatar that is made by the avatar generating portion 120 to predetermined space coordinates, and the seat, the steering device, and the mirrors (side view and rear view) of the vehicle are optimally adjusted.

The virtual avatar 990 (see FIG. 9) is disposed in the predetermined space coordinates corresponding to the vehicle, and the integrated control portion 130 controls the seat control portion 140, the steering device control portion 150, and the mirror control portion 160 corresponding thereto.

The seat control portion 140 controls the height and front/rear position of a lower seat 940, the slope of a seat back 930, the length of a lumbar supporting portion 910, and the height of a neck supporting portion 920, the steering device control portion 150 controls a tilting angle and a telescopic length of a steering wheel 960, and the mirror control portion 160 adjusts a side view mirror 1000 and a rear view mirror 1100 in left/right and up/down directions.

Figure 2:
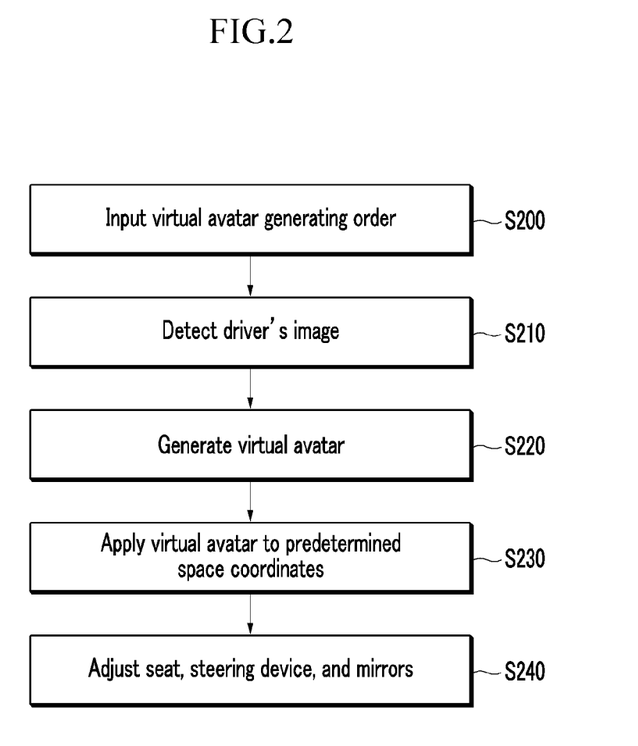
FIG. 2 is a flowchart showing a control method of a vehicle according to an exemplary embodiment of the present invention.

FIG. 2 is a flowchart showing a control method of a vehicle according to an exemplary embodiment of the present invention.

Referring to FIG. 2, an order for generating a virtual avatar 990 is input in S200 and a driver's image is detected in S210.

The driver's image that is detected in S210 is used to generate a 3D virtual avatar 990 in S220, and the 3D virtual avatar is applied to the predetermined space coordinates corresponding to the vehicle in S230. The predetermined space coordinates includes the seat, the steering device, the side view mirrors, and the rear view mirror of the vehicle.

Further, the seat, the steering device, and the mirrors of the vehicle are adjusted according to the body type of the virtual avatar 990 in S240.

The lower seat 940, the seat back 930, the neck supporting portion 920, lumbar supporting portion 910, the steering wheel 960, the side view mirrors 1000, and the rear view mirror 1100 are controlled by electric motors in an exemplary embodiment of the present invention.

Figure 3:
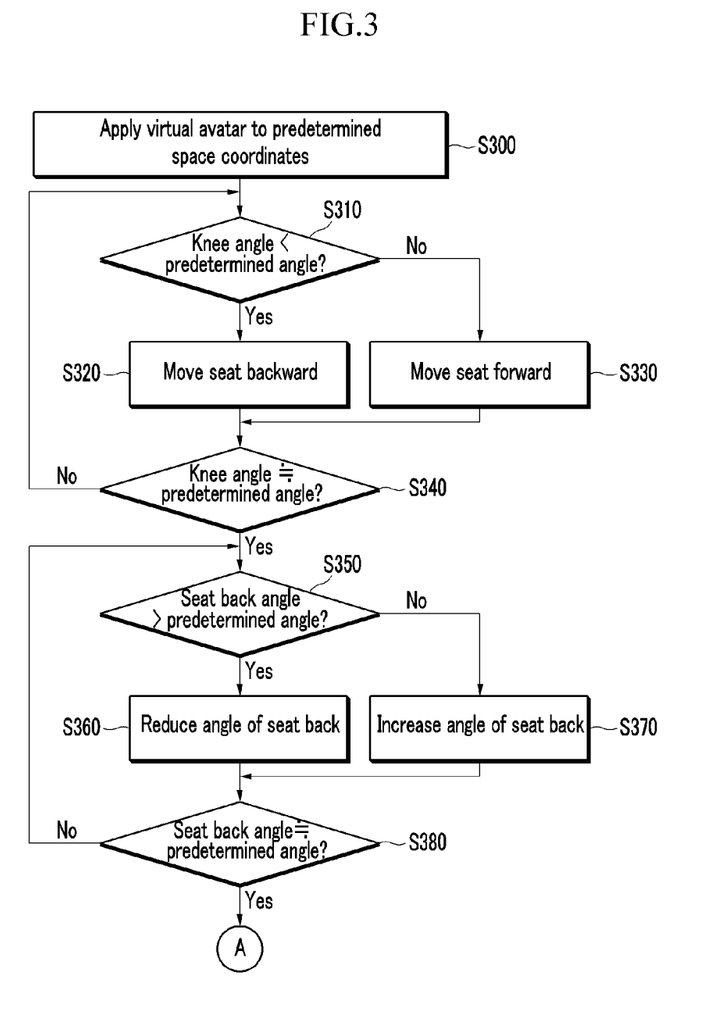
FIG. 3 is a flowchart showing a method for controlling a front/rear position of a seat using a virtual avatar in a vehicle according to an exemplary embodiment of the present invention.

FIG. 3 is a flowchart showing a method for controlling a forward/rearward position of a seat using a virtual avatar in a vehicle according to an exemplary embodiment of the present invention.

Figure 9:
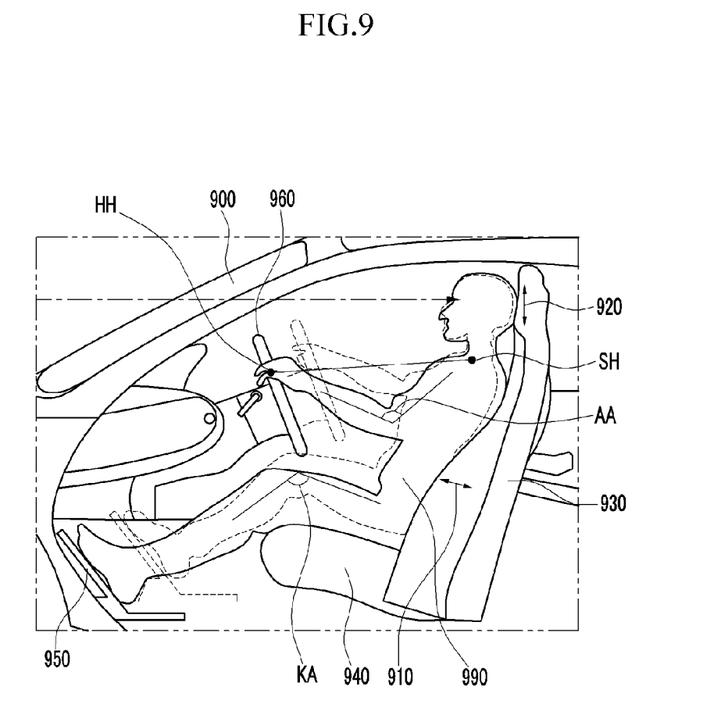
FIG. 9 is a side view showing a condition in which a virtual avatar is applied to a vehicle according to an exemplary embodiment of the present invention.

Referring to FIG. 3 and FIG. 9, the virtual avatar 990 is applied to the 3D predetermined space coordinates corresponding to the vehicle in S300, and it is determined whether a knee angle (KA) of the virtual avatar 990 is less than a predetermined angle in S310. Here, the thighs and back of the virtual avatar 990 contact the lower seat 940 and the back seat 930, respectively, and the brake pedal 950 is operated to its limit.

If the knee angle (KA) of the virtual avatar 990 is less than a predetermined angle, the lower seat 940 is moved backward in S320, if the knee angle (KA) thereof is not less than the predetermined angle, the lower seat 940 is moved forward in S330, and if the knee angle (KA) reaches the predetermined angle in S340, S350 is performed.

If the angle of the seat back 930 is more than the predetermined angle in S350, it is reduced in S360, and if the angle of the seat back 930 is less than the predetermined angle, it is increased in S370. Further, if the angle of the seat back 930 reaches the predetermined angle in S380, S410 of FIG. 4 is performed.

Figure 4:
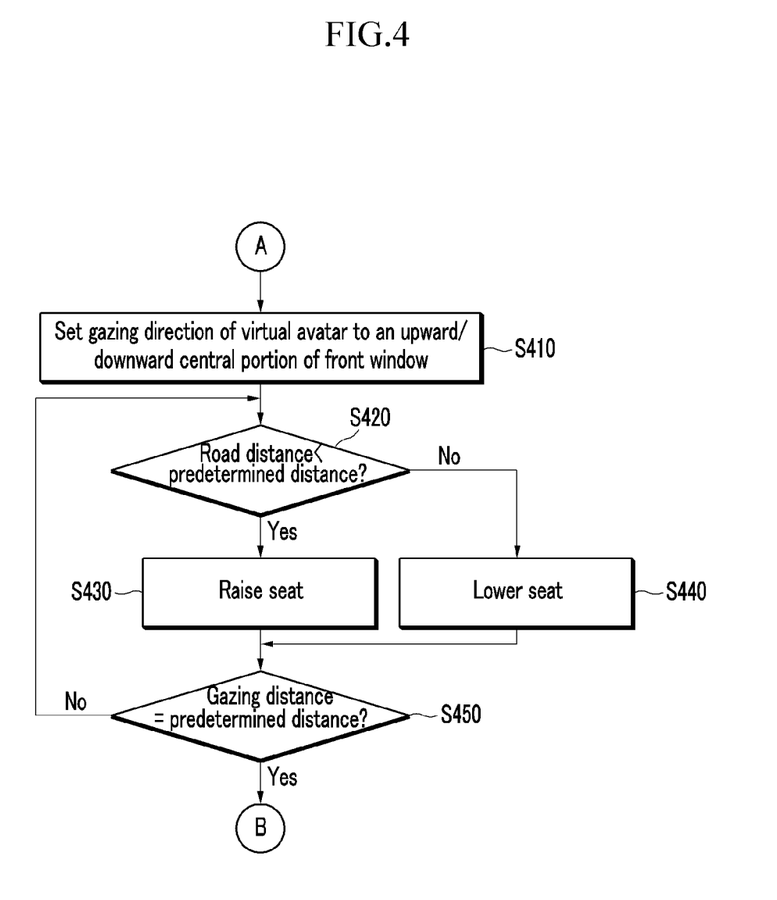
FIG. 4 is a flowchart showing a method for controlling an up/down position of a seat using a virtual avatar in a vehicle according to an exemplary embodiment of the present invention.

FIG. 4 is a flowchart showing a method for controlling an upper/lower position of a seat using the virtual avatar in the vehicle according to an exemplary embodiment of the present invention.

Referring to FIG. 4, a gazing direction of the virtual avatar 990 is set in S410. Here, the virtual avatar 990 gazes in a front direction of the vehicle, wherein the gazing direction thereof is to a middle point of the front window 900 based on an upward/downward direction.

As described above, the virtual avatar 990 is set to gaze at the middle point of the front window 900, and it is determined whether the distance of the road that the virtual avatar 990 sees is less than a predetermined distance in S420.

If the sight distance is less than the predetermined value, the lower seat 940 on which the virtual avatar 990 sits is lowered by the controller in S430. Further, if the sight distance is not less than the predetermined value, the lower seat 940 on which the virtual avatar 990 sits is raised by the controller in S440.

If the distance of the road surface that the virtual avatar 990 gazes at reaches the predetermined distance from the avatar 990, the upward/downward control of the lower seat 940 is completed in S450.

Figure 5:
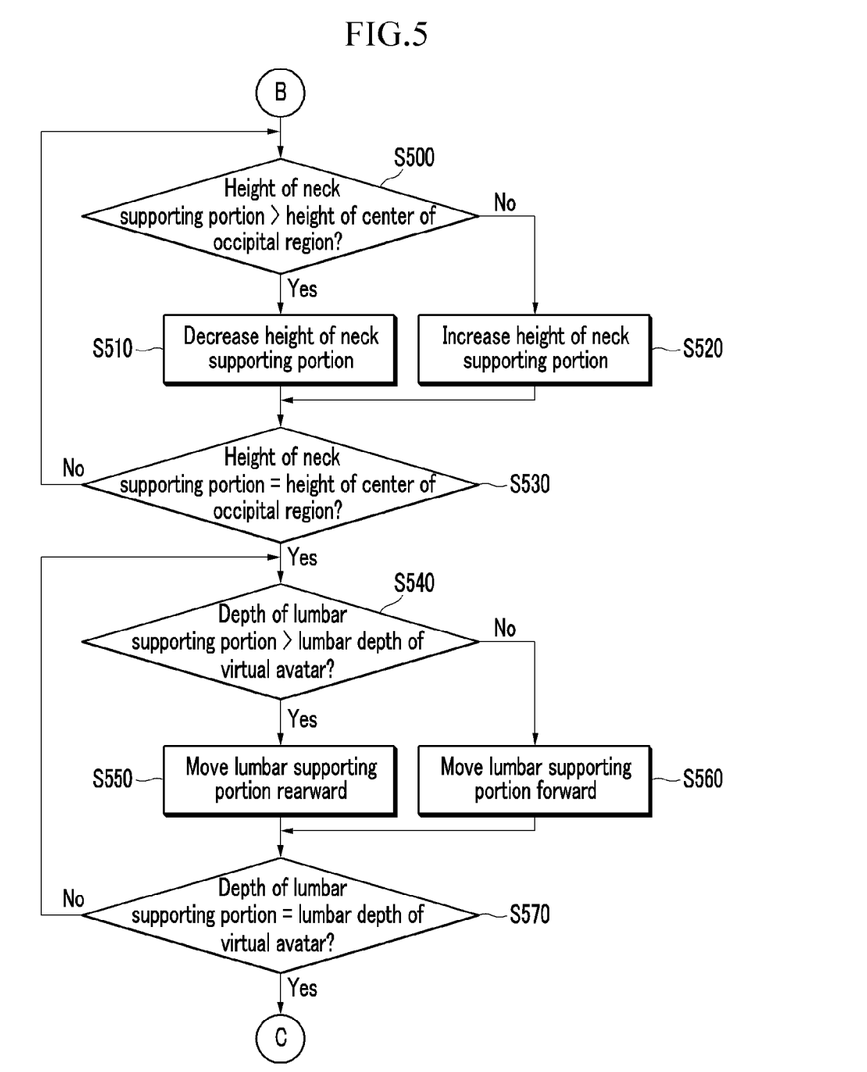
FIG. 5 is a flowchart showing a method for controlling a position of a lumbar supporting portion and a neck supporting portion of a seat using a virtual avatar in a vehicle according to an exemplary embodiment of the present invention.

FIG. 5 is a flowchart showing a method for controlling a position of a lumbar supporting portion and a neck supporting portion of a seat using a virtual avatar in a vehicle according to an exemplary embodiment of the present invention.

Referring to FIG. 5 and FIG. 9, it is determined whether a center height of the neck supporting portion that supports the neck of the virtual avatar 990 is higher than that of the center of the occipital region of the virtual avatar 990 in S500.

The height of the neck supporting portion 920 is decreased or increased in S510 and S520 according to the height of the center of the occipital region of the virtual avatar 990.

If the height of the neck supporting portion 920 becomes equal with the height of the center of the occipital region of the virtual avatar 990 in S530, the height control of the neck supporting portion 920 ends.

The depth of the lumbar supporting portion 910 is compared with a depth of the virtual avatar 990 in S540, and if the depth of the lumbar supporting portion 910 is greater than that of the virtual avatar 990, the lumbar supporting portion 910 is contracted in the rearward direction of the vehicle in S550, while if the depth of the lumbar supporting portion 910 is lesser than that of the virtual avatar 990, the lumbar supporting portion 910 is expanded in the forward direction of the vehicle in a S560.

If the depth of the lumbar supporting portion 910 becomes equal to the depth of the virtual avatar 990 lumbar portion in S570, the control of the lumbar supporting portion 910 ends.

Figure 6:
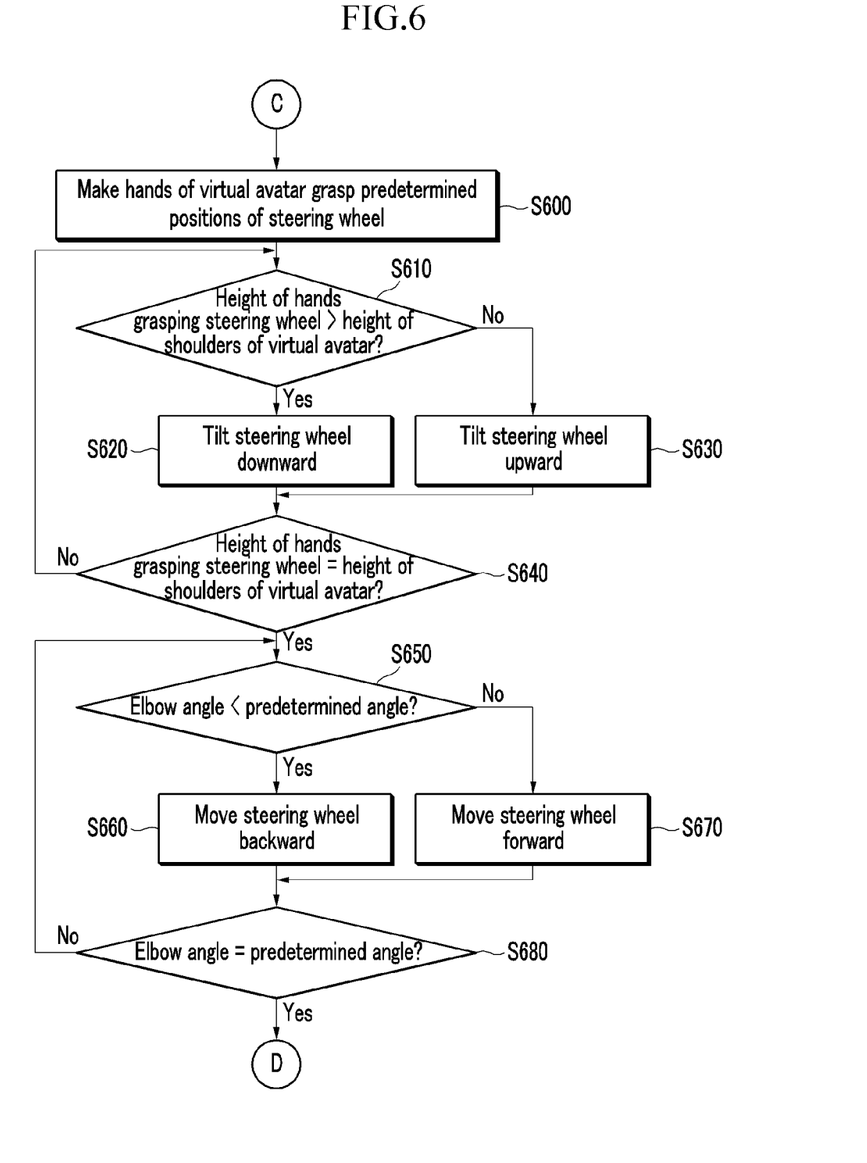
FIG. 6 is a flowchart showing a method for controlling a steering device using a virtual avatar in a vehicle according to an exemplary embodiment of the present invention.

FIG. 6 is a flowchart showing a method for controlling a steering device using a virtual avatar in a vehicle according to an exemplary embodiment of the present invention.

Referring to FIG. 6 and FIG. 9, both hands of the virtual avatar 990 are set to grasp predetermined positions of the steering wheel 960 in S600. Here, the predetermined positions of the steering wheel 960 can be points corresponding to 10 o'clock and two o'clock of the steering wheel 960.

In this condition, it is determined whether the hand height (HH) where the virtual avatar 990 grasps the steering wheel 960 is higher than the shoulder height (SH) of the virtual avatar 990 in S610.

If the hand height (HH) when grasping the steering wheel 960 is higher than the shoulder height (SH), the steering wheel 960 is tilted downward in S620, and if the hand height (HH) when grasping the steering wheel 960 is lower than that of the shoulder height (SH), the steering wheel 960 is tilted to be raised in S630. The raising or lowering of the steering wheel 960 is achieved by tilt control of the steering column.

If the height control of the steering wheel 960 ends in S640, S650 is performed.

It is determined whether the elbow angle (AA) of the virtual avatar 990 is greater than a predetermined angle in S650, and if the elbow angle is greater, the steering wheel 960 is telescopically controlled to retreat in S660, and if the elbow angle is not greater, the steering wheel 960 is telescopically controlled to advance in S670.

If the elbow angle (AA) of the virtual avatar 990 reaches the predetermined angle in S680, the telescopic control of the steering wheel 960 ends.

Figure 7:
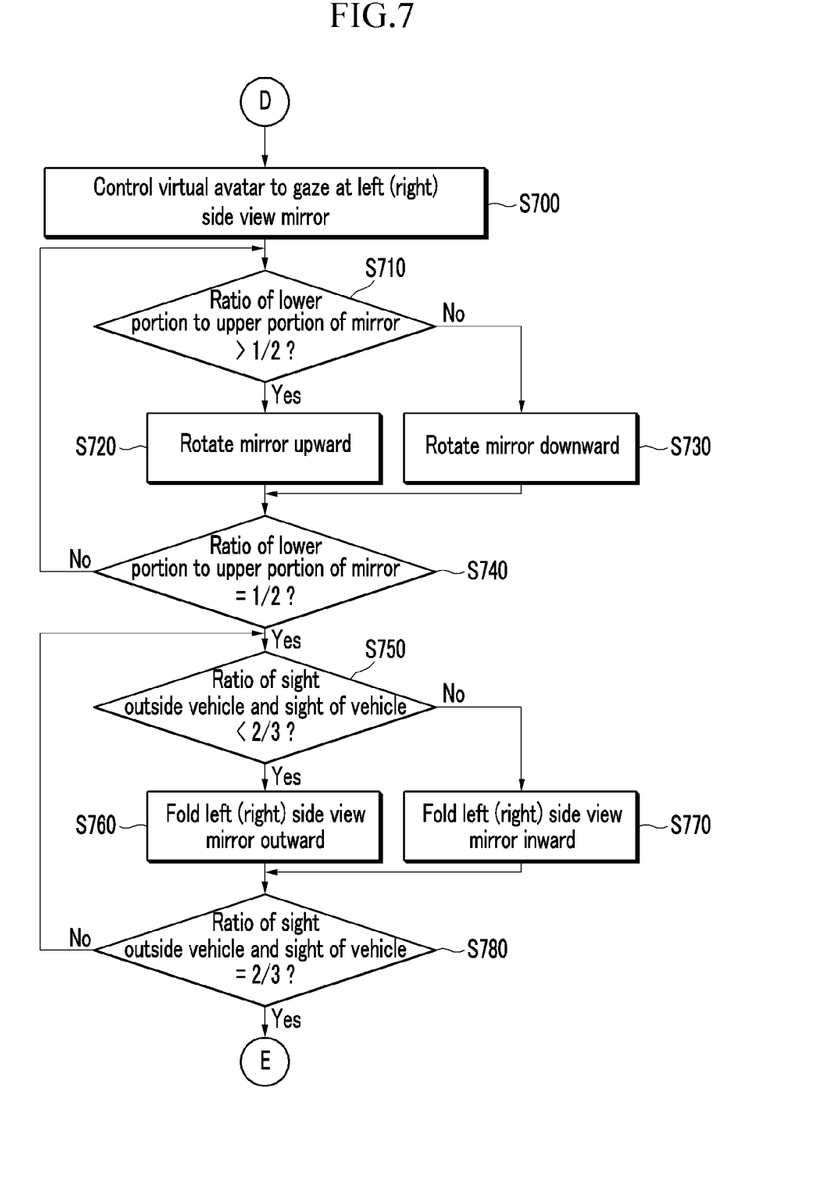
FIG. 7 is a flowchart showing a method for controlling a side view mirror using a virtual avatar in a vehicle according to an exemplary embodiment of the present invention.

FIG. 7 is a flowchart showing a method for controlling a side view mirror using a virtual avatar in a vehicle according to an exemplary embodiment of the present invention.

Figure 10:
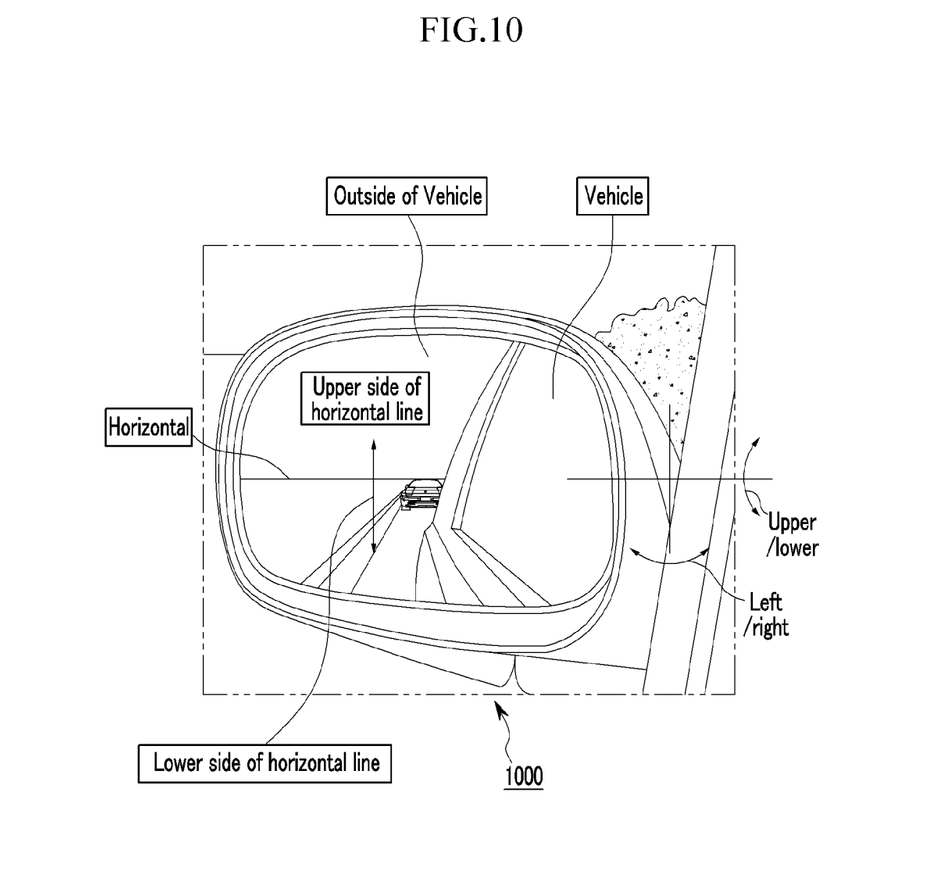
FIG. 10 shows a side view mirror that is seen through an eye of a virtual avatar in a vehicle according to an exemplary embodiment of the present invention.

Referring to FIG. 7 and FIG. 10, the virtual avatar is set to gaze at a central portion of the left/right side view mirror in S700.

The virtual avatar 990 sees an upper portion and a lower portion based on a virtual horizontal line through the side view mirror 1000, and it is determined whether the ratio of the lower portion of the virtual horizontal line that is seen by the virtual avatar 990 is larger than 50% in S710.

If it is determined that the ratio of the lower portion of the virtual horizontal line is larger than 50%, the left side view mirror 1000 is rotated upward in S720, and if it is determined that the ratio of the lower portion of the virtual horizontal line is smaller than 50%, the left side view mirror 1000 is rotated downward based on the vehicle in a S730.

If the ratio of the lower portion of the virtual horizontal line reaches 50% in S740, S750 is performed.

It is determined whether the ratio of sight outside the vehicle and sight of the vehicle is smaller than two-thirds in S750, if the outside ratio of the virtual vehicle is less than two-thirds, the side view mirror 1000 is folded outward in S760, and if the outside ratio of the virtual vehicle is larger than two-thirds, the side view mirror 1000 is folded inward in S770.

If the outside ratio of the virtual vehicle reaches two-thirds in S780, the control of the side view mirror 1000 ends.

Figure 8:
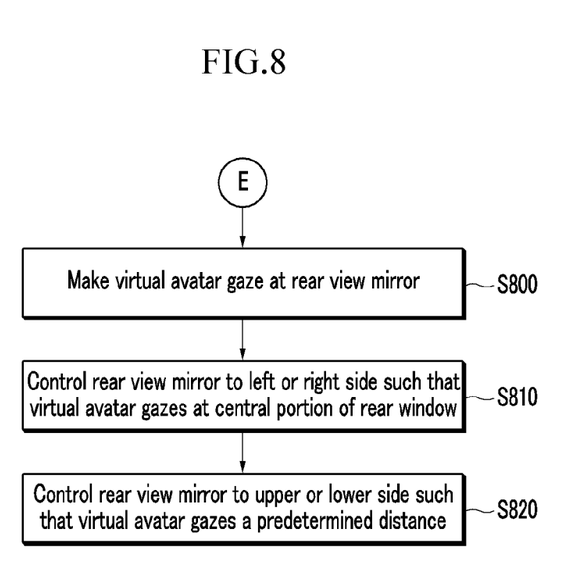
FIG. 8 is a flowchart showing a method for controlling a rear view mirror using a virtual avatar in a vehicle according to an exemplary embodiment of the present invention.

FIG. 8 is a flowchart showing a method for controlling a rear view mirror using a virtual avatar in a vehicle according to an exemplary embodiment of the present invention.

Figure 11:
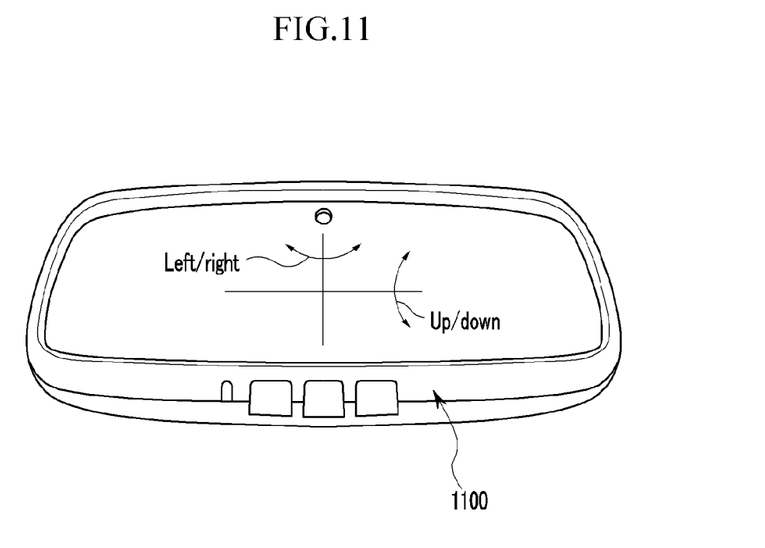
FIG. 11 shows a rear view mirror that is seen through an eye of a virtual avatar in a vehicle according to an exemplary embodiment of the present invention.

Referring to FIG. 8 and FIG. 11, the virtual avatar 990 is controlled to gaze at the rear view mirror 1100 in S800, and the rear view mirror 1100 is controlled in a left/right direction such that the virtual avatar 990 can see the central portion of the rear window through the rear view mirror 1100 in S810, and the rear view mirror 1100 is controlled in an upper/lower direction such that the virtual avatar 990 can see a predetermined distance through the rear view mirror 1100 in S820.

FIG. 9 is a view showing a condition in which a virtual avatar is applied to a vehicle according to an exemplary embodiment of the present invention.

Referring to FIG. 9, the vehicle includes the front window 900, the neck supporting portion 920, the seat back 930, the lower seat 940, the lumbar supporting portion 910, the brake pedal 950, and the steering wheel 960, wherein the hip and the lumbar region of the virtual avatar 990 contact the lower seat 940 and the seat back 930, respectively, and the head of the virtual avatar 990 contacts the neck supporting portion 920.

Further, the foot of the virtual avatar 990 pushes the brake pedal 950 and the hands of the virtual avatar 990 grasp the steering wheel 960. As described above, the shoulder height (SH) of the virtual avatar 990 is controlled to become the hand height (HH) at which the hands grasp the steering wheel 960, and the lower seat 940 and the seat back 930 are respectively controlled such that the knee angle (KA) and the elbow angle (AA) become predetermined angles.

FIG. 10 shows a side view mirror that is seen through the eyes of a virtual avatar in a vehicle according to an exemplary embodiment of the present invention.

Referring to FIG. 10, an upper portion of the virtual horizontal line and a lower portion of the virtual horizontal line are seen through the side view mirror 100, and the vehicle and the view outside thereof are seen based on a boundary of the vehicle and the view outside it.

The side view mirror is controlled such that the ratio of the upper portion of the virtual horizontal becomes a predetermined value, and the side view mirror is controlled such that the ratio of the view outside vehicle becomes a predetermined value in the present invention.

FIG. 11 shows a rear view mirror that is seen through the eyes of a virtual avatar in a vehicle according to an exemplary embodiment of the present invention.

Referring to FIG. 11, the virtual avatar 990 looks to the rear of the vehicle through the rear view mirror 1100, wherein the rear view mirror 1100 is controlled such that the gazing distance becomes a predetermined value and is controlled such that the virtual avatar 990 can look to a central portion of the rear window.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: input portion
110: image detecting portion
120: avatar generating portion
130: integrated control portion
140: seat control portion
150: steering device control portion
160: mirror control portion
900: front window
910: lumbar supporting portion
920: neck supporting portion
930: seat back
940: lower seat
950: brake pedal
960: steering wheel
990: virtual avatar
1000: side view mirror
1100: rear view mirror
KA: knee angle
AA: elbow angle
SH: shoulder height
HH: hand height

What is claimed is:

1. A control system of a vehicle, comprising:
an input portion configured to input an order for generating a virtual avatar of a driver of the vehicle;
an image detection portion that is a camera disposed on the vehicle configured to detect an image of the driver according to the order that is input by the input portion;
an avatar generating portion configured to utilize the image of the driver to generate the virtual avatar corresponding to a body shape of the driver; and
an integrated control portion configured to control at least one of a driver seat, a steering device, a side view mirror, and a rear view mirror according to the body shape of the driver as indicated by the virtual avatar.

2. The control system of a vehicle of claim 1, wherein the integrated control portion is configured to apply the virtual avatar to predetermined space coordinates corresponding to the vehicle.

3. The control system of a vehicle of claim 1, wherein the integrated control portion is configured to return the driver seat, the steering device, the side view mirror, or the rear view mirror to an original position and applies the virtual avatar to the original position.

4. The control system of a vehicle of claim 1, wherein the integrated control portion includes a seat control portion that is configured to control front/rear position, height, and slope of a seat back of the driver seat.

5. The control system of a vehicle of claim 4, wherein the seat control portion is configured to control a front/rear position of the driver seat such that a knee angle of the virtual avatar becomes a predetermined angle in a condition that the virtual avatar pushes the brake to its limit,
to control the slope of the seat back such that the seat back is slanted to a predetermined angle,
to control the height of the seat of the driver such that a gazing distance that the virtual avatar sees through a front window of the vehicle becomes a predetermined length,
to control the position of the lumbar supporting portion of the driver seat along the lumbar slope of the virtual avatar, and
to control the neck supporting portion of the driver seat to coincide with an occipital region center.

6. The control system of a vehicle of claim 1, wherein the integrated control portion is configured to control a telescopic length and a tilting angle of the steering device.

7. The control system of a vehicle of claim 6, wherein the steering device control portion is configured to:
make both hands of the virtual avatar grasp predetermined positions of the steering wheel,
control a tilting angle of the steering wheel such that the shoulder height of the virtual avatar becomes equal to the height of the hands grasping the steering wheel, and
control a telescopic length of the steering wheel such that the elbow angle of the virtual avatar becomes a predetermined value.

8. The control system of a vehicle of claim 1, wherein the integrated control portion includes a mirror control portion that is configured to control up/down/left/right angles of the side view mirror or the rear view mirror.

9. The control system of a vehicle of claim 8, wherein the mirror control portion is configured to:
control the up/down angle of the side view mirror such that the ratio of the lower portion of an virtual horizontal line, which is seen by the eye of the virtual avatar through the side view mirror, becomes a predetermined value, and
control the left/right angle of the side view mirror such that the ratio of the outside of the vehicle body, which is seen by the virtual avatar through the side view mirror, becomes a predetermined value.

10. The control system of a vehicle of claim 8, wherein the mirror control portion is configured to control the left/right angle of the rear view mirror such that the eye of the virtual avatar gazes at a central portion of the rear window through the rear view mirror, and to control the up/down angle of the rear view mirror such that the gazing distance of the virtual avatar through the rear view mirror becomes a predetermined value.

11. The control system of a vehicle of claim 1, wherein the input portion is an input unit that is disposed in the vehicle or a portable communication means.

12. The control system of a vehicle of claim 1, wherein the image detecting portion is a rear camera of a vehicle.

13. A method, comprising:
inputting an order for generating a virtual avatar of a driver of a vehicle;
detecting by a camera disposed on the vehicle an image of the driver according to the input order;
generating a virtual avatar of the driver based on the detected image of the driver, the virtual avatar corresponding to a body shape of the driver; and
controlling at least one of a driver seat, a steering device, a side view mirror, and a rear view mirror according to the body shape of the driver as indicated by the virtual avatar.

* * * * *